(12) United States Patent
Campagna (10) Patent No.: US 11,534,925 B2
(45) Date of Patent: Dec. 27, 2022

(54) CONFORMAL GRIPPING END EFFECTOR (71) Applicant: RE2, Inc., Pittsburgh, PA (US)

(72) Inventor: Mario Campagna, Pittsburgh, PA (US)

(73) Assignee: RE2, Inc., Pittsburgh, PA (US)

( * ) Notice: Subject to any disclaimer, the term of this patent is extended or adjusted under 35 U.S.C. 154(b) by 0 days.

(21) Appl. No.: 17/161,970

(22) Filed: Jan. 29, 2021

(65) Prior Publication Data

US 2021/0229295 A1 Jul. 29, 2021

Related U.S. Application Data (60) Provisional application No. 62/967,380, filed on Jan. 29, 2020.

(51) Int. Cl.
*B25J 15/00* (2006.01)
*B25J 15/02* (2006.01)

(52) U.S. Cl.
CPC ......... *B25J 15/0009* (2013.01); *B25J 15/024* (2013.01)

(58) Field of Classification Search
CPC .... B25J 15/0009; B25J 15/022; B25J 15/024; B25J 15/08; Y10S 901/36
USPC ........................................................ 294/106
See application file for complete search history.

(56) References Cited

U.S. PATENT DOCUMENTS

| 4,094,016 A | * | 6/1978 | Eroyan | A61F 2/583 623/24 |
| 5,201,501 A | * | 4/1993 | Fassler | B23Q 1/76 269/156 |
| 5,762,390 A | * | 6/1998 | Gosselin | B25J 15/103 294/106 |
| 9,643,323 B2 | * | 5/2017 | Nagatsuka | B25J 15/0009 |
| 2018/0296369 A1 | * | 10/2018 | Smit | A61F 2/583 |
| 2019/0152068 A1 | * | 5/2019 | Kondo | B25J 9/1065 |

FOREIGN PATENT DOCUMENTS

CN 106564065 * 4/2017

* cited by examiner

*Primary Examiner* — Dean J Kramer
(74) *Attorney, Agent, or Firm* — Schwegman Lundberg & Woessner, P.A.

(57) ABSTRACT

Techniques for a conformal gripping end effector such as a gripping finger are provided. In an example, a conformal finger mechanism can include a proximal link, a connecting link, a distal link, a finger link coupling and a spring. The proximal link can be coupled via a proximal link pivot to an actuator housing and the connecting link can be coupled to an actuator rod of the actuator and the distal link. The distal link can be coupled to the connecting link and the proximal link. The spring can be coupled to an offset portion of a proximal end of the proximal link.

18 Claims, 7 Drawing Sheets

CONFORMAL GRIPPING END EFFECTOR

CLAIM OF PRIORITY AND RELATED APPLICATIONS

This application claims the benefit of priority to Campagna, U.S. Provisional Patent Application Ser. No. 62/967,380, titled, "Conformal Gripping End Effector, filed on Jan. 29, 2020, and hereby incorporated by reference herein in its entirety.

TECHNICAL FIELD

This document pertains generally, but not by way of limitation, to robotic end effectors. More particularly, this disclosure relates to, but not by way of limitation, a conformal gripping robotic end effector.

BACKGROUND

Robotic end effectors are typically designed for accomplishing a single task or limited variety of special tasks. In contrast, a conformal gripping end effector is designed to mimic the dexterity of the human hand and allow a robot to grip or manipulate a wide variety of objects.

Conformal gripping end effectors for robotic applications have been developed with numerous different approaches. An earlier design from RE2, Inc. is detailed in U.S. Pat. No. 8,991,884, titled "Robotic hand with conformal finger" to Mark J. DeLouis, which is hereby incorporated by reference in its entirety. This conformal gripper design achieves the conformal grip by using belts and pulleys to achieve the desired friction around the pulleys for the joint to actuate at the desire load. When an object is grasped, the tension in the belt is increased and force is applied to the object.

Another gripper design is illustrated in U.S. Pat. No. 5,501,498, titled "Methods and apparatus for mechanically intelligent grasping" to Nathan T. Ulrich, also referred to as the Barrett Hand. The Barrett Hand uses a worm gear and clutch mechanism that allows a joint to "breakaway" at a pre-determined level of torque allowing the next joint to continue until it comes in contact with an object. It uses a cable driven system to transfer the torque to the next joint. The Barrett Hand is non-backdrivable since it uses worm gears for its actuation.

Yet another gripper design is shown in U.S. Pat. No. 8,973,958, titled "Gripper having a two degree of freedom underactuated mechanical finger for encompassing and pinch grasping" to Louis-Alexis Allen Demers, Simon Lefrancois, and Jean-Philippe Jobin, also referred to as the Robotiq Gripper. The Robotiq gripper can include a mechanical finger that can include a first phalanx and a second phalanx that are pivotally connected. When a load is applied on a stable pinch grasp region, an actuation mechanism is adapted to allow the second phalanx to translate and allow its contact surface to maintain a constant orientation in order to automatically perform a pinch grasp, when a load is applied on the first phalanx or below the stable pinch grasp region, the actuation mechanism is adapted to allow the second phalanx to pivot and automatically perform an encompassing grasp.

Overview

Techniques for a conformal gripping end effector such as a gripping finger are provided. In an example, a conformal finger mechanism can include a proximal link, a connecting link, a distal link, a finger link coupling and a spring. The proximal link can be coupled via a proximal link pivot to an actuator housing and the connecting link can be coupled to an actuator rod of the actuator and the distal link. The distal link can be coupled to the connecting link and the proximal link. The spring can be coupled to an offset portion of a proximal end of the proximal link.

By using a spring instead of linkages, the proximal link has the ability to sustain a substantial amount of force on the object prior to the distal link grasping the object. For example, the Robotiq Gripper discussed above only actuates the distal link which only applies substantial force on the proximal link when the distal link makes contact with the object. Prior to that, the proximal link does not have much force holding the object. This makes for an unstable grasp if the object is moving or insecure. The design described in this document functions differently than the Robotiq gripper with similar parts. This design has gripping capability with the proximal link by having a substantial spring force pushing on the proximal link. The Robotiq hand has very limited grip capability with the proximal link until the distal link touches an object. The design discussed in this document also pulls objects into the palm of the gripper where the Robotiq gripper pulls objects into the "V" shape created between the distal and proximal links.

The conformal grip discussed in this document is a much simpler, if not, more elegant and cost-effective way of achieving a conformal grip by having a significantly reduced part count.

The design described in this document can be either backdrivable or non-backdrivable depending on the intended use case of the gripper. A way to achieve this would be to design the actuator with a ball screw (backdrivable) or an ACME screw (non-backdrivable) depending on the user's needs.

This Overview is intended to provide non-limiting examples of the present subject matter—it is not intended to provide an exclusive or exhaustive explanation. The Detailed Description below is included to provide further information about the present apparatuses and methods.

DETAILED DESCRIPTION

The present application relates to devices, systems and mechanisms for providing a conformal gripping end effector. More specifically, the present application discusses a conformal finger that can be utilized to produce a conformal gripping robotic end effector. This document describes a design for an underactuated conformal finger for a gripper/end effector as well as describing the manner in which the conformal grip is achieved. These conformal fingers can be oriented or put together to compile a gripper/end effector with as many or few fingers as desired. The fingers may be comprised of two or more links and/or two or more degrees of freedom per finger.

Conformal grip is engaging an object like a human hand, by closing the first finger link (Proximal Link) until it engages the object, then closing the second finger link until it engages the object, then closing the third link until it engages the object. This conformal grip allows for secure grip of many different size and shape objects.

Figure 1:
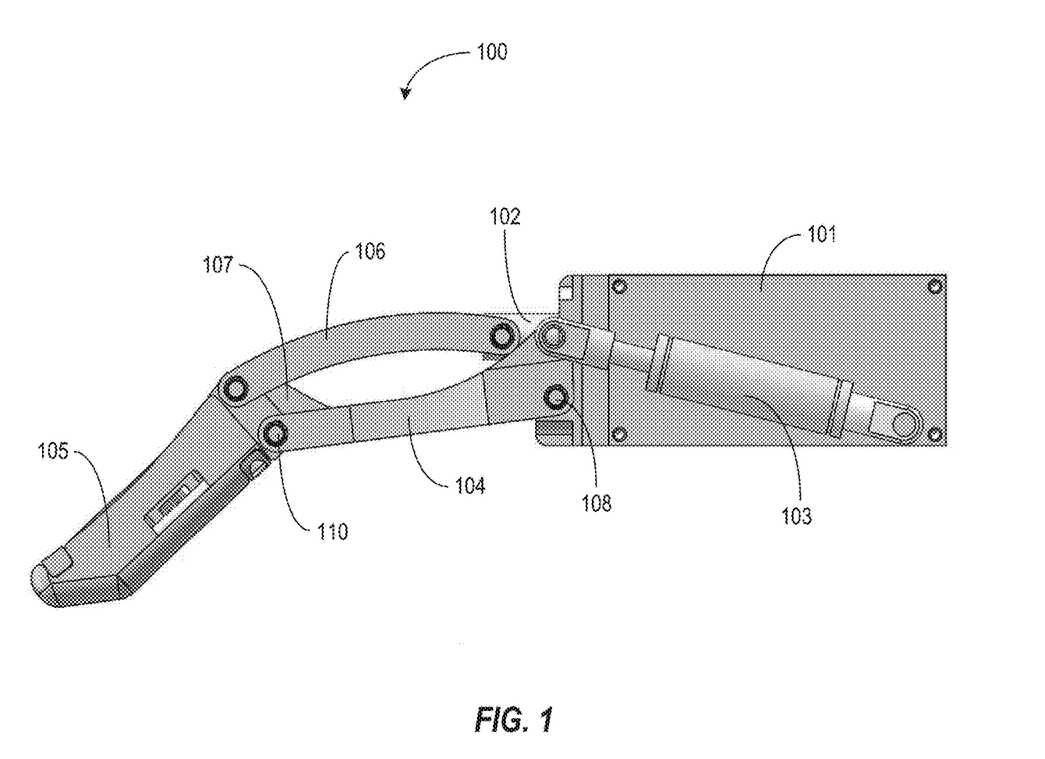
FIG. 1 illustrates generally an example finger 100 according to the present subject matter.

FIG. 1 illustrates generally an example finger 100 according to the present subject matter. The finger 100 can include an actuator 101, an actuator rod 102, a spring 103, a proximal link 104, a distal link 105, a connecting link 106, and a finger link coupling 107. The actuator 101 can provide motion to the finger 100 by extending and contracting the actuator rod 102. Possible actuators can include, but are not limited to, a pneumatic cylinder, a linear motor, a motor activated screw or combinations thereof. The distal link 105 provides the structure of the tip of the finger 100. The connecting link 106 can include a pivot at each end. The connecting link 106 can pivotably couple to the distal link 105 at one end and to the actuator rod 102 at the other. The proximal link 104 provides additional structure of the finger. The proximal link 104 can be pivotably coupled with the body of the actuator 101 at one end and with the distal link 105 at the other end. The spring 103 can be coupled between a fastener on the housing of the actuator 100 and a pin of the proximal link 104. The spring 103 can have stored energy to expand and force the proximal link 104 to pivot about proximal link pivot 108 to close the finger 100. As such, a pneumatic cylinder or other mechanism that can store expansive mechanical force can be used in place of an actual spring in certain examples. The proximal link pivot is where the proximal link 104 couples with the body of the actuator 101. The distal link 105 can include pivot connections for coupling the distal link 105 to the connecting link 106 and to the proximal link 104. The distal link 105 can include a distal link pivot 110 for coupling the distal link 105 to the proximal link 104. The finger link coupling 107 can allow the distal link 105 to move in sync with the proximal link 104 during a first state of the proximal link 104 while also allowing the distal link 105 to move independent of the proximal link 104 during a second state of the proximal link 104. In certain examples, the finger link coupling can be part of the proximal link 104 and can be rigidly mounted to the proximal link 104.

As discussed above, each finger 100 includes a distal link 105 and a proximal link 104 in which the distal link 105 is actively driven by the actuator 101 via the connecting link 106. The proximal link 104 is passively activated by the spring 103 and actively restrained by the actuator 101. The proximal link is connected directly to the actuator body and the distal link is connected to the actuator rod through the connecting link. The spring applies force to the proximal link creating torque about the proximal link pivot 108. The spring retracts or extends based on the position of the actuator.

Figure 2A:
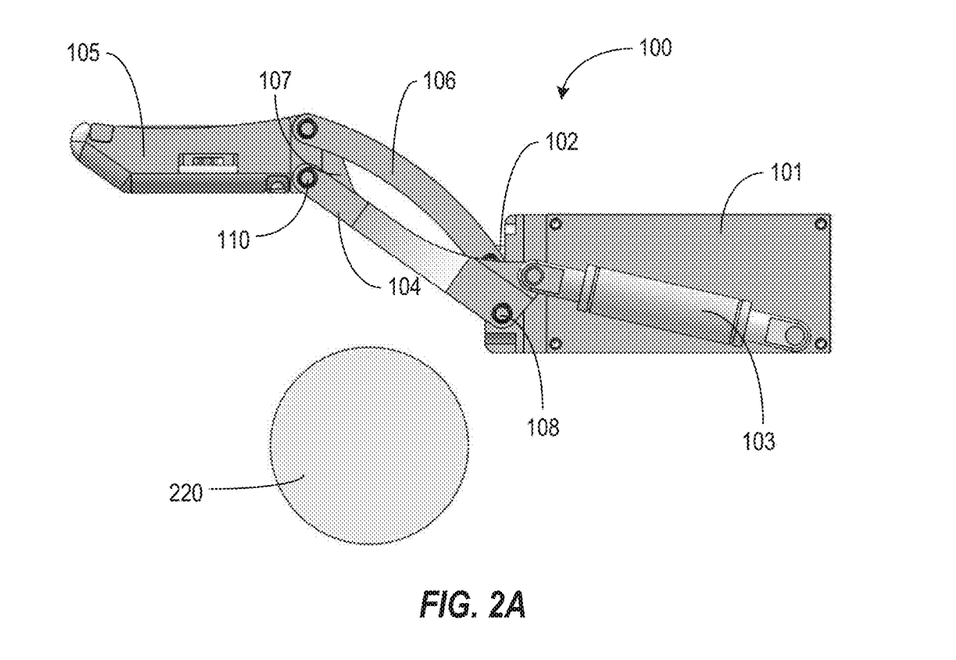
FIGS. 2A-2C illustrate generally a method of closing an example finger 100 about an object 220.
Figure 2B:
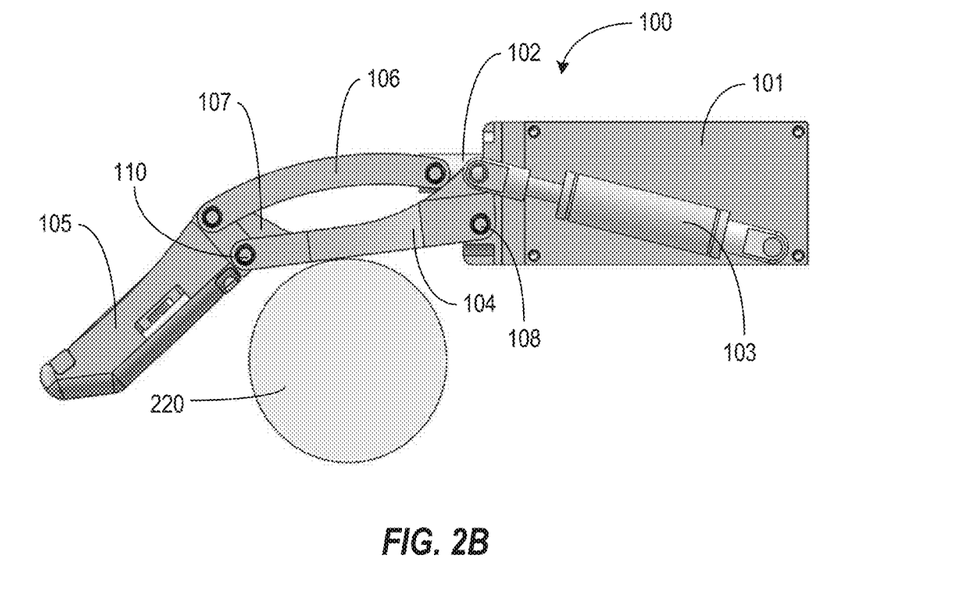
Figure 2C:
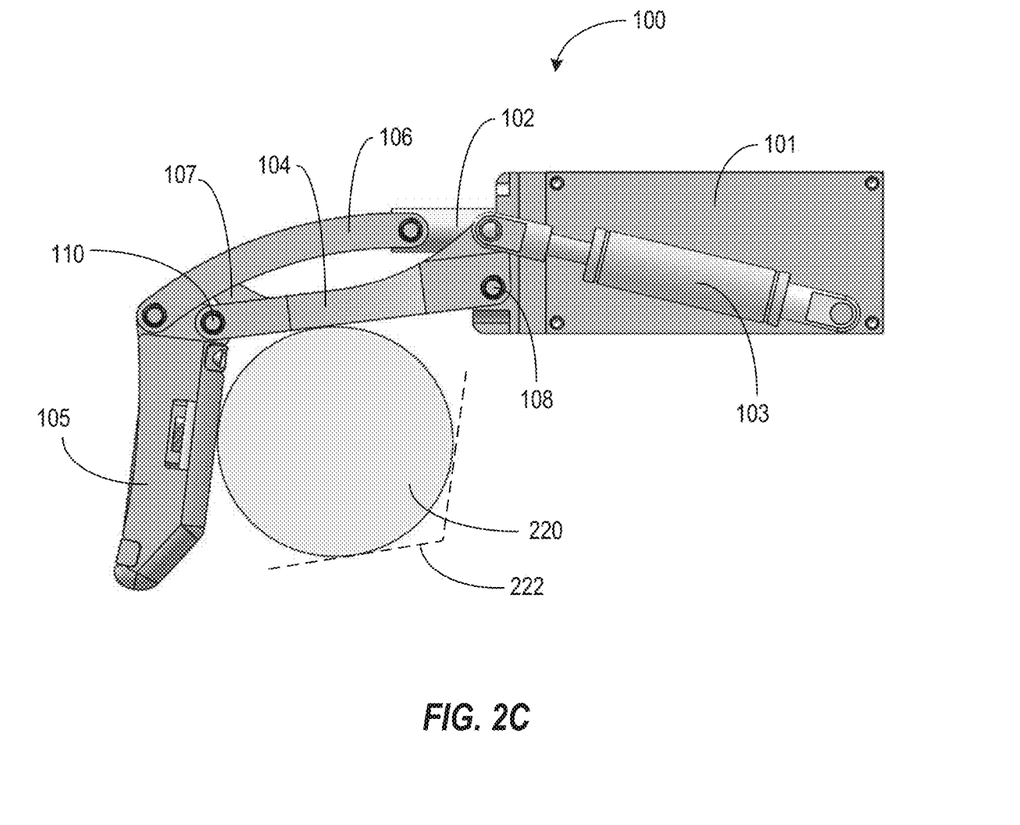

FIGS. 2A-2C illustrate generally a method of closing an example finger 100 about an object 220. FIG. 2A illustrates generally the example finger 100 beginning to close about the object 220. FIG. 2B illustrates the example finger 100 in an intermediate position while closing to grip the object 220. FIG. 2C illustrates the example finger 100 closed about and gripping the object 220. As the finger 100 begins to close and grip the object 220, the actuator 101 begins to extend the actuator rod 102, and the proximal link 104 and the distal link 105 move together with their relative positions to one another staying the same (e.g., FIG. 2A). The relative static positions of the proximal link 104 and distal link 105 means that the distal link 105 does not rotate relative to the proximal link 104 about the distal link pivot 110. The relative fixed position of the distal link 105 with respect to the proximal link 104 is fixed due to the spring 103 pushing a reference edge of the finger link coupling 107 against a reference edge of the distal link 105. Once the proximal link 104 engages the object 220 (e.g., FIG. 2B), the spring 103 can apply load onto the proximal link 104 allowing it to grip and secure the object 220. When the force of the spring 103 is counteracted through contact of the proximal link 104 with the object 220, the proximal link 104 can cease movement and the force pushing the reference edge of the finger link coupling 107 against a reference edge of the distal link 105 can diminish. As the actuator rod 102 continues to extend (FIG. 2C), the actuator rod 102 applies force to the distal link 105 (through the connecting link 106) generating torque about the distal link pivot 110 causing rotation of the distal link 105 about the distal link pivot 110. The distal link 105 can disengage from the finger link coupling 107 and begin to wrap around the object 220 with the proximal link 104 staying in place and further securing the object 220. Movement of the distal link 105 will continue until a resulting force counteracts the actuator 101.

It is understood that if the object 220 is to be moved by the finger 100 or the gripper employing the finger 100, the gripper most likely includes an optional backstop appendage 222 to capture and grip the object with the finger 100. However, if the object 220 is fixed, a backstop appendage 222 may or may not be used. A scenario in which a backstop appendage 222 may not be used may occur if the finger 100 is used to close about the object 220 and then the machine coupled to the finger 100 uses the object 220 to move the machine itself. This last scenario is analogous to how one could use just a finger, or a set of fingers, to climb a series of bars, such as rungs of a ladder, for example. Further, a gripper can employ multiple opposing fingers 100 to engage multiple sides of an object, such as object 220.

Figure 3A:
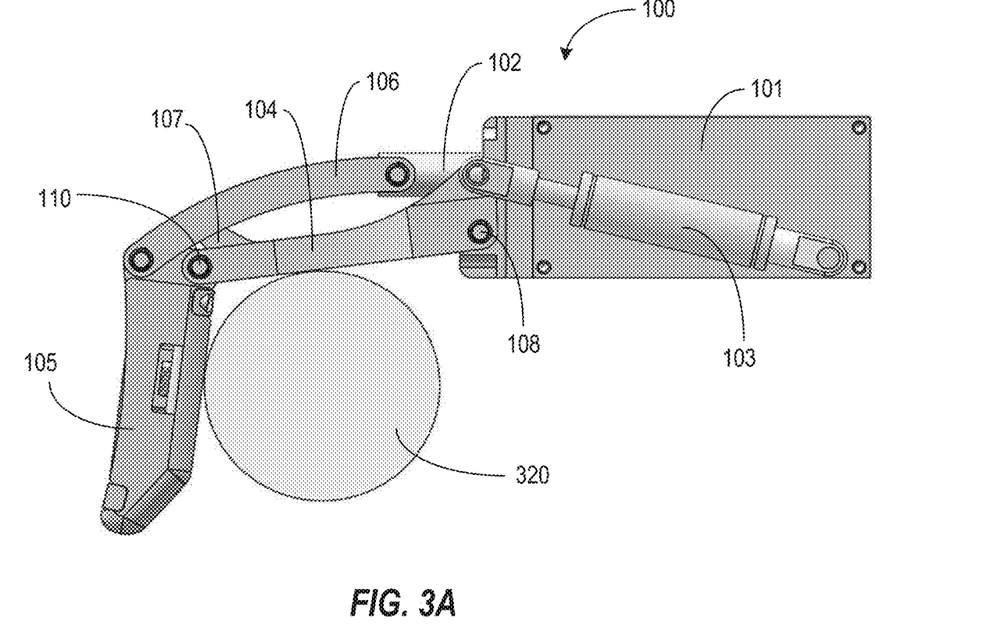
FIGS. 3A-3C illustrate generally an example finger 100 opening to release a gripped object 320.
Figure 3B:
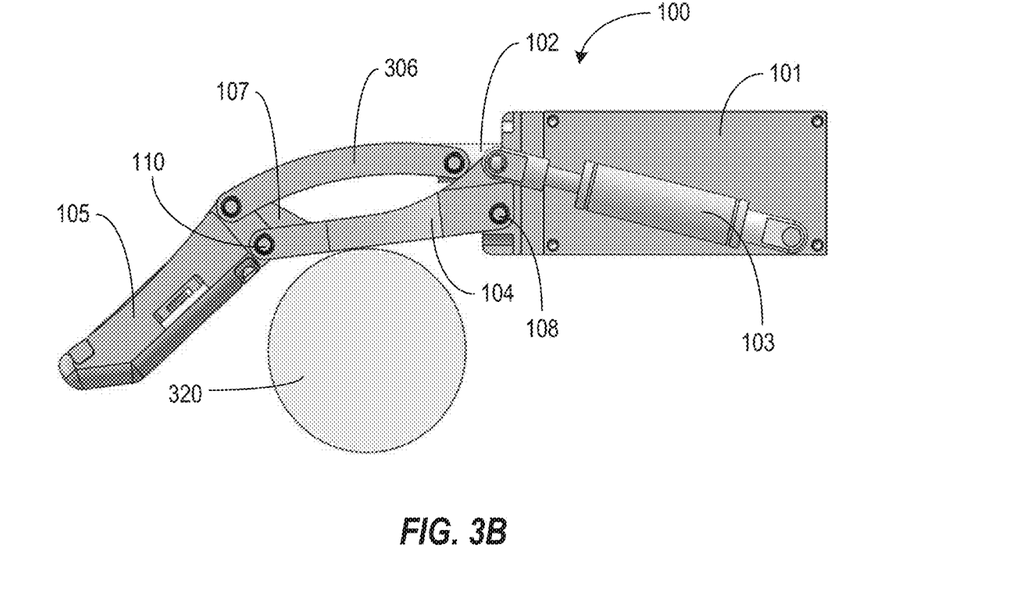
Figure 3C:
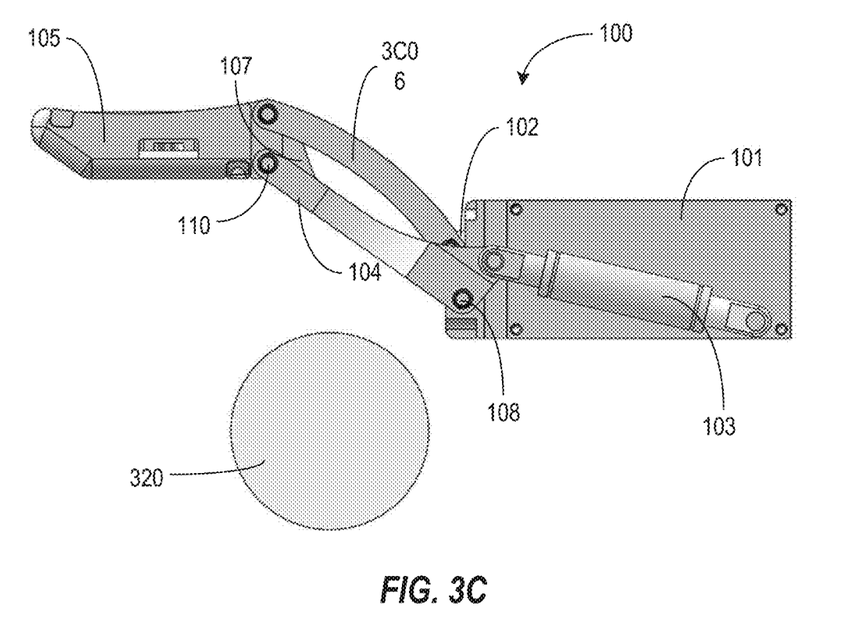

FIGS. 3A-3C illustrate generally an example finger 100 opening to release a gripped object 320. FIG. 3A illustrates the example finger 100 closed about and gripping the object 320, for example, just before beginning to release the object 320. FIG. 3B illustrates the example finger 100 in an intermediate position while opening, and FIG. 3C illustrates generally the example finger 100 in a fully open position. The actuator 100 can begin to retract the actuator rod 102 to initiate opening the finger 100. Initial retraction of the actuator rod 102 begins to rotate the distal link 105 away from the object 320. Further retraction of the actuator rod 102 causes the distal link 105 to engage with the finger link coupling 107. Engagement of the reference edges of the distal link 105 and the finger link coupling 107 can cause the distal link 105 and proximal link 104 to move together. As such, continued retraction of the actuator rod 102 causes the proximate link 105 to rotate away from the object 320 via pivoting about the proximal link pivot 108 until the finger is in a fully open position as shown in FIG. 3C.

Figure 4:
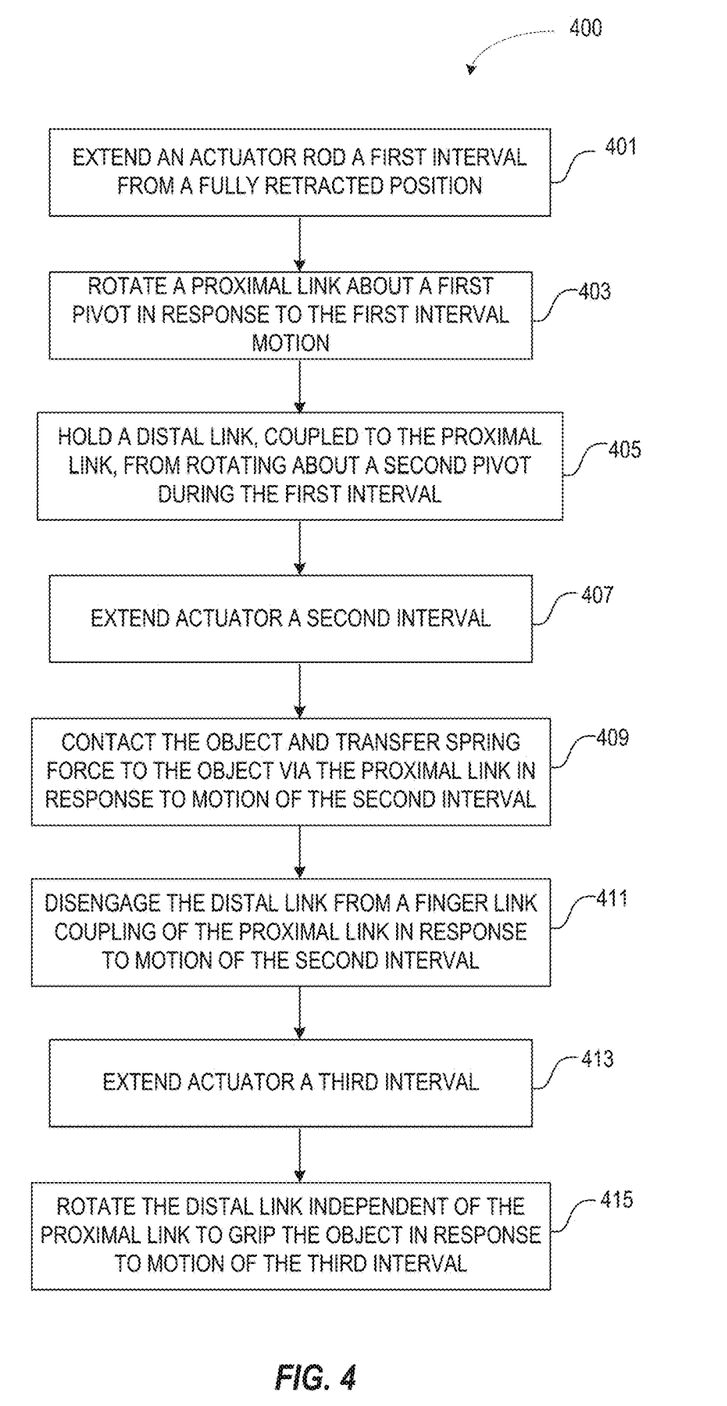
FIG. 4 illustrates generally and flowchart of an example method 400 of operating a conformal end effector including an example finger to grip an object.

FIG. 4 illustrates generally and flowchart of an example method 400 of operating a conformal end effector including an example finger to grip an object. At 401, an actuator rod of an actuator of the finger can be extended a first interval from a fully retracted state of the actuator. At 403, a proximal link of the finger can be rotated about a first pivot in response to extending an actuator from the fully retracted position. The first pivot, the proximal link pivot, can couple the proximal link to a body of the actuator. At 405, a distal link of the finger can be held from rotating about a second pivot during the first interval in response to spring coupled to a first proximal end of the proximal link, and a connecting link coupled between an actuator rod of the actuator and a third pivot coupling the connecting link with the distal link. At 407, the actuator can be extended a second interval. At 409, the proximal link can contact the object and spring force can be transferred to the object via the proximal link in response to motion of the second interval. At 411, the distal link can disengage from a finger link coupling of the proximal link and independent of the proximal link begin to rotate about the second pivot toward the object in response to motion of the second interval. At 413, the actuator can be extended a third interval. At 415, the distal link can continue to rotate about the second pivot independent of the proximal link to grip the object in response to motion of the third interval.

Figure 5:
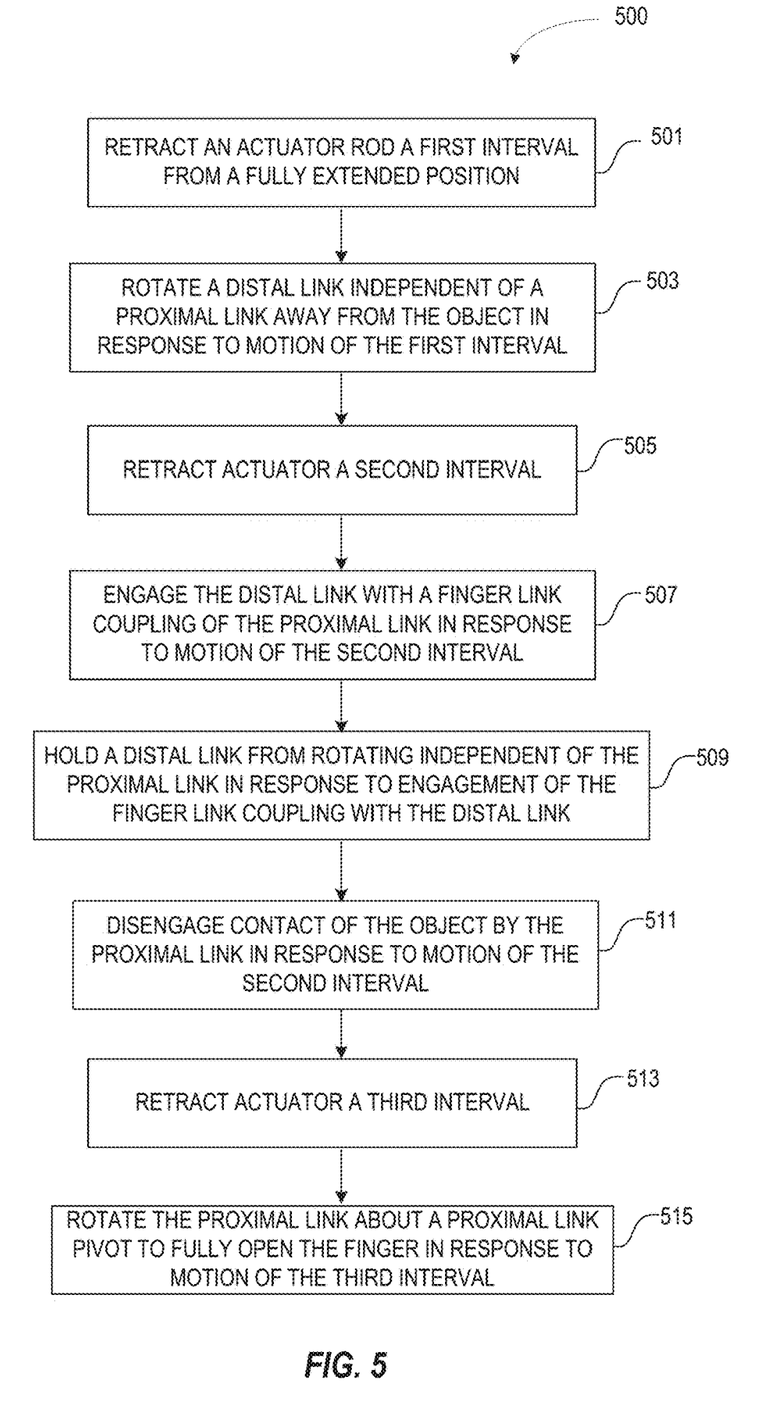
FIG. 5 illustrates generally a flowchart of an example method of operating a conformal end effector including an example finger to release a gripped object.

FIG. 5 illustrates generally a flowchart of an example method of operating a conformal end effector including an example finger to release a gripped object. At 501, an actuator rod of an actuator of the finger can be retracted a first interval from a fully extended position of the actuator. At 503, a distal link of the finger can be rotated independent of a proximal link of the finger away from the object. The distal link can be coupled to the actuator via the proximal link and independently via a connecting link. The proximal link can connect the distal link to the body of the actuator. The connecting link can connect the distal link with the actuator rod. At 505, the actuator can be retracted a second interval. At 507, the distal link can engage with a finger link coupling of the proximal link in response to motion of the second interval. At 509, engagement of the distal link with the finger link coupling can prevent the distal link from rotating independent of the proximal link as the actuator retracts through the second interval. In addition, at 511, the engagement of the distal link with the finger link coupling can begin to release spring force from the object via the proximal link and can begin to rotate the proximal link away from the object. A 513, the actuator can be retracted a third interval. A 515, the proximal link can continue to rotate about the proximal link pivot to fully open the finger. The proximal link pivot can couple the proximal link with the body of the actuator.

The above detailed description includes references to the accompanying or incorporated drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention includes:

1. A conformal finger mechanism comprising:
    a proximal link coupled via a proximal link pivot to an actuator housing;
    a finger link coupling forming at least a portion of the proximal link;
    a connecting link coupled to an actuator rod and a distal link;
    the distal link coupled to the connecting link and proximal link; and
    a spring coupled to an offset portion of a proximal end of the proximal link
    wherein the finger link coupling includes an engaged state configured to synchronize movement of the distal link and the proximal link, and
    wherein the finger link coupling includes a disengaged state configured to enable independent movement of the distal link.

2. The conformal finger mechanism of claim 1, wherein the spring applies a force to the proximal link.

3. The conformal finger mechanism of claim 1, wherein the actuator housing is configured to house the actuator rod.

4. The conformal finger mechanism of claim 3, wherein a first end of the spring is coupled to the offset portion of the proximal end of the proximal link; and
wherein a second end of the spring is coupled to the actuator housing.

5. The conformal finger mechanism of claim 4, wherein the spring is configured to force the offset portion of the proximal end of the proximal link away from the actuator housing.

6. The conformal finger mechanism of claim 1, wherein the distal link is coupled to the connecting link at a first distal link pivot.

7. The conformal finger mechanism of claim 6, wherein the distal link is coupled to the proximal link at a second distal link pivot laterally offset from the first distal link pivot.

8. A method of operating a conformal end-effector finger, the method including:
maintaining, throughout operation of the conformal end-effector finger, a spring force against an offset portion of a proximal end of a proximal link biasing rotation of the proximal link around a first pivot point towards a closed position;
extending an actuator a first interval from a fully retracted position to begin closing the conformal end-effector finger about an object;
rotating the proximal link of the conformal end-effector finger about the first pivot point in response to extending an actuator from the fully retracted position, the first pivot point configured to couple the proximal link to a body of the actuator; and
holding a distal link of the conformal end-effector finger from rotating about a second pivot in response to the spring force acting on a first distal end of the proximal link, and a connecting link coupled between an actuator rod of the actuator and a third pivot coupling the connecting link with the distal link.

9. The method of claim 8, including:
extending the actuator a second interval after completing the first interval;
engaging the object with the proximal link in response to extending the actuator the second interval; and
transferring the spring force from prohibiting rotation of the distal link about the second pivot to applying pressure to the object via the proximal link.

10. The method of claim 9, including:
extending the actuator a third interval after completing the second interval; and
rotating the distal link about the second pivot toward the object in response to the actuator rod extending the connecting link during the third interval.

11. The method of claim 10, including contacting the object with the distal link in response to extending the actuator the third interval.

12. The method of claim 11, including applying a force of the actuator to the object via the distal link in response to extending the actuator the third interval.

13. The method of claim 9, wherein engaging the object with the proximal link in response to extending the actuator the second interval includes clamping the object between the proximal link and a backstop appendage of an end effector coupled to the conformal end-effector finger.

14. A method of operating a conformal end-effector finger, the method including:
retracting an actuator rod of an actuator a first interval from a fully extended position of the actuator to begin releasing the conformal end-effector finger;
releasing a first force of the actuator on an object via a distal link of the conformal end-effector finger in response to retracting the actuator rod the first interval, the distal link coupled to the actuator rod via a connecting link and to a housing of the actuator via a proximal link;
rotating the distal link independent of the proximal link about a distal link pivot away from the object in response to retracting the actuator rod the first interval, the distal link pivot coupling the distal link with the proximal link;
maintaining a spring force on the object via the proximal link during the first interval, the spring force generated from a spring coupled to an offset portion of a proximal end of the proximal link, the spring force causing rotation about a proximal link pivot coupling the proximal link with the actuator housing;
retracting the actuator rod a second interval upon completion of the first interval; and
engaging the distal link with a finger link coupling of the proximal link in response to retracting the actuator rod the second interval.

15. The method of claim 14, wherein engaging the distal link with a finger link coupling of the proximal link includes relieving the spring force from assertion on the object in response to retracting the actuator rod the second interval.

16. The method of claim 14, wherein engaging the distal link with a finger link coupling of the proximal link includes disengaging the proximal link from contact with the object.

17. The method of claim 14, includes:
retracting the actuator rod a third interval upon completion of the second interval;
holding constant a relative position of the distal link with respect to the proximal link in response to retracting the actuator rod the third interval; and
rotating the proximal link about the proximal link pivot, the proximal link pivot coupling the proximal link with the actuator in response to retracting the actuator rod the third interval.

18. A conformal finger mechanism comprising:
a proximal link coupled via a proximal link pivot to an actuator housing;
a finger link coupling forming at least a portion of the proximal link;
a connecting link coupled to an actuator rod and a distal link;
the distal link coupled to the connecting link and proximal link; and
a spring including a first end coupled to an offset portion of a proximal end of the proximal link and a second end coupled to the actuator housing, the spring configured to force the offset portion of the proximal end of the proximal link away from the actuator housing,
wherein the actuator housing is configured to house the actuator rod.

\* \* \* \* \*